United States Patent
Seder et al.

(10) Patent No.: US 8,605,011 B2
(45) Date of Patent: Dec. 10, 2013

(54) VIRTUAL VIEWFINDER ON FULL WINDSHIELD HEAD-UP DISPLAY

(75) Inventors: Thomas A. Seder, Northville, MI (US); Joseph F. Szczerba, Grand Blanc, MI (US); Dehua Cui, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 304 days.

(21) Appl. No.: 12/980,522

(22) Filed: Dec. 29, 2010

(65) Prior Publication Data

US 2012/0169572 A1 Jul. 5, 2012

(51) Int. Cl.
*G09G 5/00* (2006.01)
*G02B 27/14* (2006.01)

(52) U.S. Cl.
USPC .................. 345/9; 345/7; 359/630; 701/400

(58) Field of Classification Search
USPC ............ 345/7–9; 359/630–633; 701/400–541
See application file for complete search history.

(56) References Cited

U.S. PATENT DOCUMENTS

| | | | |
|---|---|---|---|
| 6,100,517 A | 8/2000 | Yahav et al. | |
| 6,847,336 B1 * | 1/2005 | Lemelson et al. | 345/8 |
| 6,986,581 B2 | 1/2006 | Sun et al. | |
| 7,090,355 B2 | 8/2006 | Liu et al. | |
| 7,182,467 B2 | 2/2007 | Liu et al. | |
| 7,213,923 B2 | 5/2007 | Liu et al. | |
| 7,460,951 B2 | 12/2008 | Altan et al. | |
| 8,098,170 B1 | 1/2012 | Szczerba et al. | |
| 8,098,171 B1 | 1/2012 | Szczerba et al. | |
| 8,300,025 B2 * | 10/2012 | Katayama | 345/173 |
| 2007/0241936 A1 * | 10/2007 | Arthur et al. | 340/958 |
| 2008/0158510 A1 | 7/2008 | Tant et al. | |
| 2009/0268946 A1 | 10/2009 | Zhang et al. | |
| 2010/0020078 A1 | 1/2010 | Shpunt | |
| 2010/0253489 A1 | 10/2010 | Cui et al. | |
| 2010/0253492 A1 | 10/2010 | Seder et al. | |
| 2010/0253493 A1 | 10/2010 | Szczerba et al. | |
| 2010/0253526 A1 | 10/2010 | Szczerba et al. | |
| 2010/0253539 A1 | 10/2010 | Seder et al. | |
| 2010/0253540 A1 | 10/2010 | Seder et al. | |
| 2010/0253541 A1 | 10/2010 | Seder et al. | |
| 2010/0253542 A1 | 10/2010 | Seder et al. | |
| 2010/0253543 A1 | 10/2010 | Szczerba et al. | |

(Continued)

FOREIGN PATENT DOCUMENTS

JP  2005138755 A  *  6/2005
WO  WO-2007043036 A1  4/2007

OTHER PUBLICATIONS

U.S. Appl. No. 12/467,340, Szczerba et al.
U.S. Appl. No. 12/467,350, Seder et al.

(Continued)

*Primary Examiner* — Bipin Shalwala
*Assistant Examiner* — Ilana Spar

(57) ABSTRACT

A method to dynamically register a view finder graphic on a driving scene of a vehicle utilizing a graphic projection display includes monitoring a user input indicated to a portion of the graphic projection display, generating a trace based on the monitored user input indicated to the portion of the graphic projection display, determining a view finder graphic representing a user-defined view finder, the user-defined view finder defined by the generated trace, dynamically registering a location of the view finder graphic upon the graphic projection display corresponding to the driving scene of the vehicle, and displaying the view finder graphic upon the graphic projection display.

20 Claims, 4 Drawing Sheets

(56) References Cited

U.S. PATENT DOCUMENTS

| | | | |
|---|---|---|---|
| 2010/0253593 A1* | 10/2010 | Seder et al. | 345/7 |
| 2010/0253594 A1 | 10/2010 | Szczerba et al. | |
| 2010/0253595 A1 | 10/2010 | Szczerba et al. | |
| 2010/0253596 A1 | 10/2010 | Szczerba et al. | |
| 2010/0253597 A1 | 10/2010 | Seder et al. | |
| 2010/0253598 A1 | 10/2010 | Szczerba et al. | |
| 2010/0253599 A1 | 10/2010 | Szczerba et al. | |
| 2010/0253600 A1 | 10/2010 | Seder et al. | |
| 2010/0253601 A1 | 10/2010 | Seder et al. | |
| 2010/0253602 A1 | 10/2010 | Szczerba et al. | |
| 2010/0253688 A1 | 10/2010 | Cui et al. | |
| 2010/0253918 A1 | 10/2010 | Seder et al. | |
| 2010/0254019 A1* | 10/2010 | Cui et al. | 359/633 |
| 2010/0289632 A1 | 11/2010 | Seder et al. | |
| 2010/0292886 A1 | 11/2010 | Szczerba et al. | |
| 2011/0141041 A1* | 6/2011 | Parkinson et al. | 345/173 |
| 2012/0089273 A1 | 4/2012 | Seder et al. | |
| 2012/0093357 A1 | 4/2012 | Seder et al. | |
| 2012/0169513 A1 | 7/2012 | Szczerba et al. | |
| 2012/0169861 A1 | 7/2012 | Szczerba et al. | |
| 2012/0173067 A1 | 7/2012 | Szczerba et al. | |
| 2012/0173069 A1 | 7/2012 | Tsimhoni et al. | |
| 2012/0174004 A1 | 7/2012 | Seder et al. | |

OTHER PUBLICATIONS

U.S. Appl. No. 12/900,566, Szczerba et al.
U.S. Appl. No. 12/900,539, Szczerba et al.
U.S. Appl. No. 12/903,267, Szczerba et al.
U.S. Appl. No. 12/980,503, Szczerba et al.
U.S. Appl. No. 12/979,432, Szczerba et al.
U.S. Appl. No. 12/980,612, Szczerba et al.
U.S. Appl. No. 12/981,206, Szczerba et al.
U.S. Appl. No. 12/981,602, Szczerba et al.
U.S. Appl. No. 12/982,478, Szczerba et al.

* cited by examiner

VIRTUAL VIEWFINDER ON FULL WINDSHIELD HEAD-UP DISPLAY

TECHNICAL FIELD

This disclosure is related to displaying a view finder graphic encompassing a user-defined view finder upon a graphic projection display corresponding to a driving scene of a vehicle.

BACKGROUND

The statements in this section merely provide background information related to the present disclosure and may not constitute prior art.

Occupants in a vehicle often desire to take pictures of objects or scenery on a driving scene of a vehicle. It would be desirable for a driver to take a picture or record video of something the driver views outside of the vehicle. For instance, a mountain range could be a noteworthy image a driver first travelling in the west may wish to keepsake. However, capturing an image or recording video of such a mountain range would require the driver to physically use a camera or video recorder to capture the mountain range while operating the vehicle. Such an action is unsafe because it would require the driver to take his/her eyes off the road to capture the image or record the video.

Head-up displays project light upon a screen and the light is converted into a viewable display upon the screen. Head-up displays are known to present information to the operator of the vehicle in an effective manner by reducing strain upon the operator while allowing the operator to remain focused on driving.

SUMMARY

A method to dynamically register a view finder graphic on a driving scene of a vehicle utilizing a graphic projection display includes monitoring a user input indicated to a portion of the graphic projection display, generating a trace based on the monitored user input indicated to the portion of the graphic projection display, determining a view finder graphic representing a user-defined view finder, the user-defined view finder defined by the generated trace, dynamically registering a location of the view finder graphic upon the graphic projection display corresponding to the driving scene of the vehicle, and displaying the view finder graphic upon the graphic projection display.

BRIEF DESCRIPTION OF THE DRAWINGS

One or more embodiments will now be described, by way of example, with reference to the accompanying drawings, in which.

DETAILED DESCRIPTION

Figure 1:
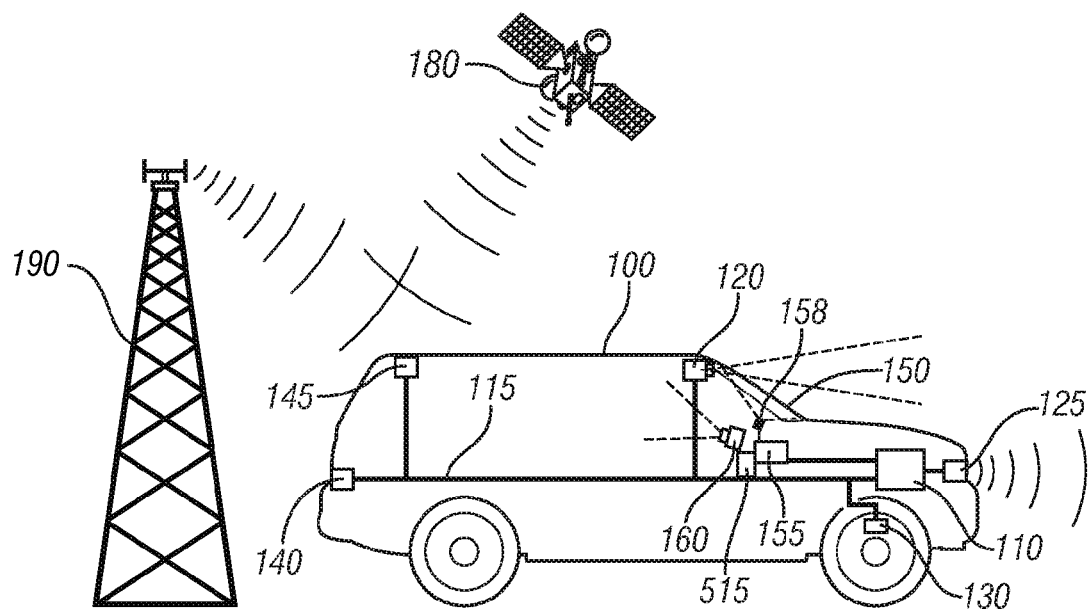
FIG. 1 illustrates an exemplary vehicle equipped with an EVS system, in accordance with the present disclosure.

Referring now to the drawings, wherein the showings are for the purpose of illustrating certain exemplary embodiments only and not for the purpose of limiting the same, FIG. 1 illustrates an exemplary vehicle equipped with an enhanced vision system (EVS), in accordance with the present disclosure. An exemplary EVS system is disclosed in Co-pending U.S. application Ser. No. 12/417,077, which is incorporated herein by reference. For purposes of this disclosure, the terms 'operator', 'user' and 'driver' will be used interchangeably herein. The vehicle 100 includes an EVS system manager 110; a user input module (UIM) 515; a graphic projection display 250 (shown in FIG. 2), vehicle sensor systems, including camera system 120 and radar system 125; vehicle operation sensors, including vehicle speed sensor 130; information systems, including GPS device 140 and wireless communication system 145; head-up display (HUD) 150; EVS graphics system 155; graphics projection system 158; and occupant eye location sensing system 160. The EVS system manager 110 includes a programmable processor including programming to monitor a user input indicated to a portion of the graphic projection display 250, shown in FIG. 2, generate a trace based on the monitored user input and determine a view finder graphic representing a user-defined view finder, wherein the user-defined view finder is defined by the generated trace. It will become apparent that the user-defined view finder defined by the generated trace can be utilized to capture still images and/or recorded video corresponding to the driving scene within the user-defined view finder. The EVS system manager can communicate directly with various systems and components, or the EVS system manager can alternatively or additionally communicate over a LAN/CAN system 115. The EVS system manager utilizes user-based inputs directed to a portion of the graphic projection display 250 to determine the view finder graphic representing the user-defined view finder and subsequently capture still images and/or recorded video corresponding to the driving scene within the user-defined view finder utilizing vehicle sensor systems such as the camera system 120. Discussed in further detail with reference to FIG. 4, the UIM 515 receives user inputs indicated to a portion of the graphic projection display 250 (e.g., HUD 150), wherein the user inputs are monitored by the EVS system manager 110. Camera system 120 includes a camera or image capturing device taking periodic or sequential images representing a view from the vehicle. Camera system 120 can be further configured to record video representing a view from the vehicle. The camera or image capturing device of the camera system 120 preferably includes 360 degrees of coverage. Radar system 125 includes a device known in the art utilizing electromagnetic radiation to detect other vehicles or objects located near the vehicle. A number of known in-vehicle sensors are used within a vehicle to monitor vehicle speed, engine speed, wheel slip, and other parameters descriptive of the operation of the vehicle. Vehicle speed sensor 130 represents one such an in-vehicle sensor, but the scope of the disclosure includes any such sensors for use by the EVS. GPS device 140 and wireless communication system 145 communicate with resources outside of the vehicle, for example, satellite system 180 and cellular communications tower 190. GPS device 140 may be utilized in conjunction with a 3D map database including detailed information relating to a global coordinate received by the GPS device 140 regarding the current location of the vehicle. Information from the vehicle sensor systems and the vehicle operation sensors can be utilized by the EVS system manager 110 to monitor the current orientation of the vehicle. HUD 150 includes a windscreen equipped with features capable of displaying an image projected thereupon while remaining transparent or substantially transparent such that occupants of the vehicle can clearly observe outside of the vehicle through the windscreen. One will appreciate that while the HUD 150 includes the windscreen in the front of the vehicle, other surfaces within the vehicle could be used for projection, including side windows and a rear window. Additionally, the view on the front windscreen could be continued upon the front vehicle "A-pillars" and onto the side windows as a continuous image. EVS graphics engine 155 includes display software or programming translating requests to display information from the EVS system manager 110 in graphical representations of the information. The EVS graphics engine 155 includes programming to compensate for the curved and tilted surface of the windscreen and any other surfaces (e.g., non-transparent components 280 shown in FIG. 2) onto which graphics are to be projected. EVS graphics engine 155 controls graphics projection system 158 including a laser or projector device producing an excitation light to project the graphical representations. Occupant eye location sensing system 160 includes sensors known in the art to approximate a location of the head of an occupant and further the orientation or gaze location of the eyes of the occupant. Based upon the output of the occupant eye location sensing system 160, the current location and orientation of the vehicle 100 and a user input location, EVS system manager 110 can accurately dynamically register the graphical representations to the HUD 150 (i.e., graphic projection display 250) such that the occupant sees the images overlaid with visual images through the windscreen. Dynamic registration of graphics will be discussed in greater detail with reference to FIG. 5.

The EVS described above includes eye sensing and head sensing devices allowing estimation of eye location, allowing dynamic registration of images upon the graphic projection display 250 (e.g., HUD 150)) such that the images correspond to a view of the operator. However, it will be appreciated that estimation of head and eye location can be achieved through a number of methods. For example, in a process similar to adjusting rearview mirrors, an operator can use a calibration routine upon entering a vehicle to align graphics to a detected object. In another embodiment, seat position longitudinally in the vehicle can be used to estimate a position of the driver's head. In another embodiment, manual adjustment of a rearview mirror or mirrors can be used to estimate location of an operator's eyes. It will be appreciated that a combination of methods, for example, seat position and mirror adjustment angle, can be utilized to estimate operator head location with improved accuracy. Many methods to accomplish accurate dynamic registration of graphics upon the graphic projection display 250 (e.g., HUD 150) are contemplated, and the disclosure is not intended to be limited to the particular embodiments described herein.

An exemplary EVS includes a wide field of view, full windscreen HUD, a substantially transparent screen including functionality to display graphical images projected thereupon; a HUD image engine including a laser or lasers capable of projecting images upon the windscreen, wherein the windscreen is an embodiment of the graphic projection display 250 illustrated in FIG. 2 below; input sources deriving data concerning the operating environment of the vehicle; and an EVS system manager including programming to monitor inputs from the input devices, process the inputs and determine critical information relative to the operating environment, and create requests for graphical images to be created by the HUD image engine. However, it will be appreciated that this exemplary EVS is only one of a wide number of configurations that an EVS can take. For example, a vision or camera system is useful to various EVS applications that will be discussed. However, it will be appreciated that an exemplary EVS system can operate without a vision system, for example, providing information available from only a GPS device, 3D map database, and in-vehicle sensors. In the alternative, it will be appreciated that an exemplary EVS system can operate without access to a GPS device or wireless network, instead utilizing inputs only from a vision system and radar system. Many configurations are possible with the disclosed systems and methods, and the disclosure is not intended to be limited to the exemplary embodiments described herein.

Figure 2:
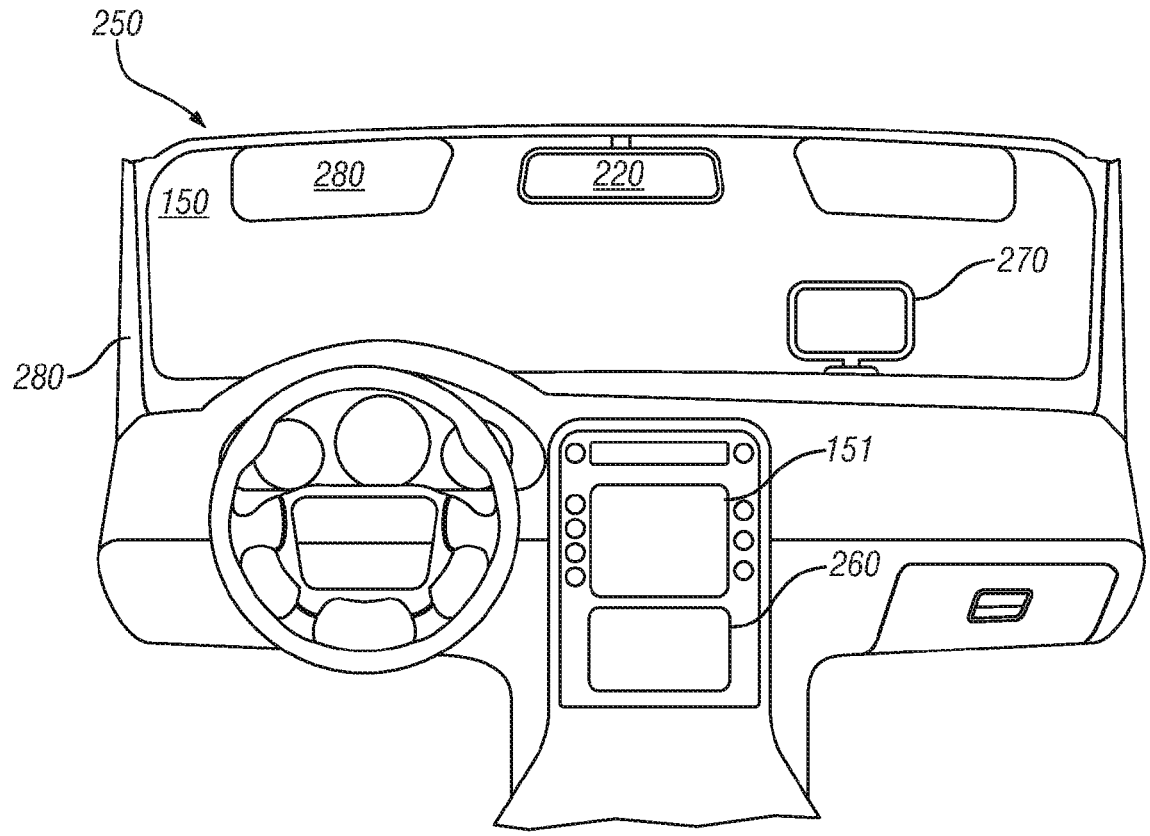
FIG. 2 illustrates graphic projection display embodiments where an image of a view corresponding to the driving scene of a vehicle and graphics can be displayed thereon, in accordance with the present disclosure.

FIG. 2 depicts the graphic projection display 250. The graphic projection display 250 includes embodiments where an image of a view corresponding to the driving scene of the vehicle and a graphic (i.e., view finder graphic or trace graphic) can be displayed thereon. The graphic projection display 250 includes the substantially transparent windscreen HUD 150, a touch screen display 260, a human machine interface (HMI) 151 having a display, non-transparent components 280 and a display monitor 270 mounted within the interior of the vehicle. It will be understood that all of the embodiments included with the graphic projection display 250 can project an image of a view corresponding to the driving scene of the vehicle. The image of the view of the driving scene need not be projected upon the substantially transparent windscreen HUD because the actual driving scene is visible through the HUD 150. The driving scene can be depicted from the camera system 120. User inputs indicated to a portion of the graphic projection display 250 corresponding to the driving scene will be discussed in further detail in FIG. 4 with reference to the UIM 515. It will be understood that the vehicle will typically require one of the embodiments of the graphic projection display 250 for displaying a view corresponding to the driving seen thereupon. However, the graphic projection display 250 could include a combination of the embodiments utilized by the vehicle 100. For instance, an image corresponding to the driving scene of the vehicle could be displayed upon both the HMI 151 and the touch screen display 260.

Figure 3:
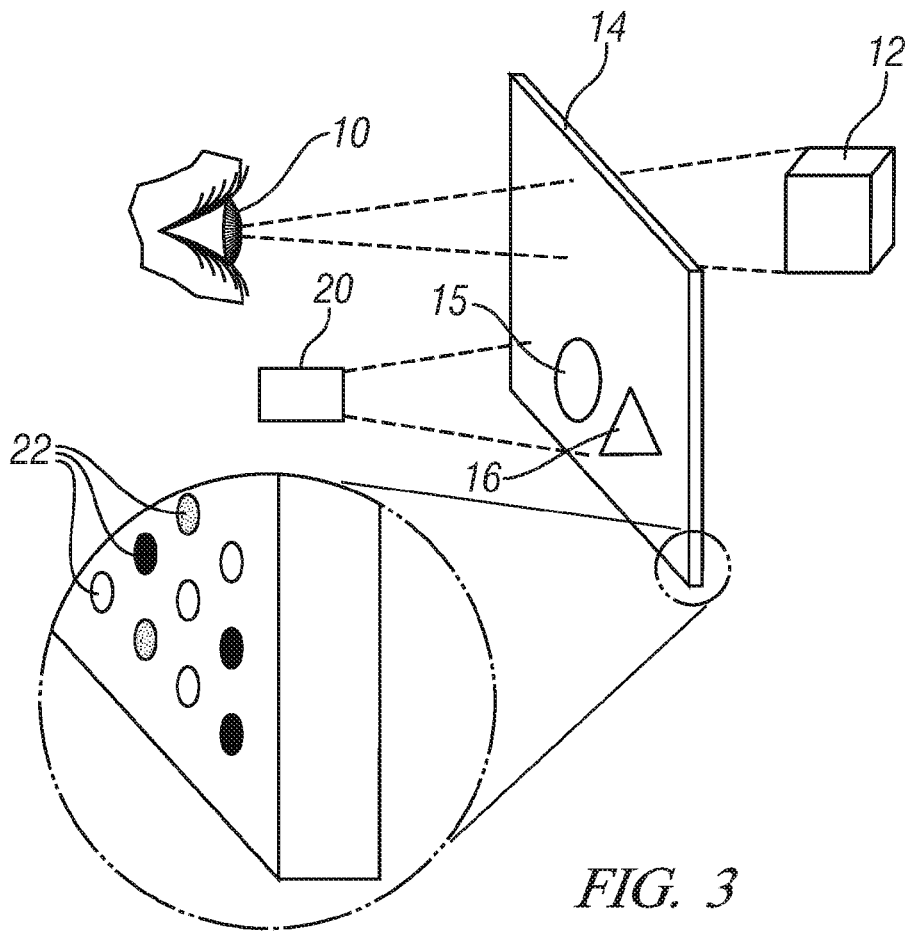
FIG. 3 illustrates a substantially transparent display, in accordance with the present disclosure.

In order to function as a medium through which relevant features are observable while serving as a display device upon which the graphical images may be displayed, the windscreen of the vehicle must be both transparent and capable of displaying images projected by an excitation light source. FIG. 3 illustrates a substantially transparent display, in accordance with the present disclosure. Viewer 10 is able to see an arbitrary object (e.g. cube 12) through substrate 14. Substrate 14 may be transparent or substantially transparent. While viewer 10 sees arbitrary object 12 through substrate 14, the viewer can also see images (e.g. circle 15 and triangle 16) that are created at substrate 14. Substrate 14 may be part of a vehicle windshield, a glass substrate, a plastic substrate, a polymer substrate, or other transparent (or substantially transparent) medium that would be appreciated by one of ordinary skill in the art. Other substrates may complement substrate 14 to provide for tinting, substrate protection, light filtering (e.g. filtering external ultraviolet light), and other functions.

FIG. 3 illustrates illumination of substrate 14 illuminated with excitation light (e.g. ultraviolet light or infrared light) from light sources (e.g. a projector or laser), depicted by device 20. The received excitation light may be absorbed by light emitting material at substrate 14. When the light emitting material receives the excitation light, the light emitting material may emit visible light. Accordingly, images (e.g. circle 15 and triangle 16) may be created at substrate 14 by selectively illuminating substrate 14 with excitation light.

In one embodiment, the excitation light is output by device 20 including a projector. The projector may be a digital projector. the projector may be a micro-mirror array (MMA) projector (e.g. a digital light processing (DLP) projector). A MMA projector that outputs ultraviolet light may be similar to a MMA projector that outputs visible light, except that the color wheel has light filters that are tailored to the ultraviolet light spectrum. the projector may be a liquid crystal display (LCD) projector. the projector may be a liquid crystal on silicon (LCOS) projector. the projector may be an analog projector (e.g. a slide film projector or a movie film projector). One of ordinary skill in the art would appreciate other types of projectors which may be used to project ultraviolet light on substrate 14.

In another embodiment, an excitation light is output from device 20, including a laser. The intensity and/or movement of a laser beam output from device 20 may be modulated to create an image in substrate 14. In down-conversion embodiments, the output from the laser may be ultraviolet light. In up-conversion embodiments, the output from the laser may be infrared light.

FIG. 3 illustrates light emitting material (e.g. light emitting particles 22) dispersed in a substantially transparent substrate. When excitation light is absorbed by the light emitting particles 22, the light emitting particles emit visible light. Accordingly, in down-conversion embodiments, when ultraviolet light is absorbed by light emitting particles 22, visible light is emitted from the light emitting particles. Likewise, in up-conversion embodiments, when infrared light is absorbed by light emitting particles 22, visible light is emitted from the light emitting particles.

FIG. 3 illustrates light emitting material, including light emitting particles 22, dispersed in a substantially transparent substrate. These light emitting particles 22 can be substantially similar particles throughout, or, as illustrated in FIG. 2, the particles can vary in composition. When excitation light is absorbed by the light emitting particles 22, the particles emit visible light. Accordingly, in down-conversion embodiments, when ultraviolet light is absorbed by light emitting particles, visible light is emitted from the light emitting particles. Likewise, in up-conversion embodiments, when infrared light is absorbed by light emitting materials, visible light is emitted from the light emitting particles. Each light emitting particle may be a different type of light emitting material, which emits a different range of wavelengths of visible light in response to a different range of wavelengths of excitation light (e.g. ultraviolet or infrared light).

Light emitting particles 22 may be dispersed throughout substrate 14. In the alternative, as illustrated in FIG. 3, the particles may be disposed on a surface of substrate 14. Light emitting particles 22 may be integrated into substrate 14 by being coated on substrate 14. Light emitting material may be fluorescent material, which emits visible light in response to absorption of electromagnetic radiation (e.g. visible light, ultraviolet light, or infrared light) that is a different wavelength than the emitted visible light. The size of the particles may be smaller than the wavelength of visible light, which may reduce or eliminate visible light scattering by the particles. Examples of particles that are smaller than the wavelength of visible light are nanoparticles or molecules. According to embodiments, each of the light emitting particles has a diameter that is less than about 400 nanometers. Each of the light emitting particles may have a diameter that is less than about 300 nanometers. According to embodiments, each of the light emitting particles has a diameter that is less than about 200 nanometers, less than about 100 nanometers, or less than about 50 nanometers. The light emitting particles may be individual molecules.

In another embodiment, the graphic projection display 250 can include the HMI device 151 having the display associated therewith for receiving a projected image of a view corresponding to the driving scene of the vehicle and displaying a graphic thereon. HMI 151 includes a computing device where the operator of the vehicle can input commands to control various systems of the vehicle in signal communication with the HMI 151 and receive desirable information. For instance, utilizing the HMI 151, the user can determine a user-defined view finder for capturing images and/or recording video within an area of the user-defined window corresponding to the driving scene. Methods of projection upon HMI displays are known in the art and this disclosure is not meant to be limited to any one method of projection.

In another embodiment, the graphic projection display 250 can include the touch screen display 260 for receiving a projected image of a view corresponding to the driving scene of the vehicle and displaying a graphic thereon. The touch screen display can be a TSIM 149 discussed in detail with reference to FIG. 4. The touch screen display 260 can be the display associated with the HMI device 151 or may be a separate display located within the vehicle. Methods of projection upon touch screen displays are known in the art and this disclosure is not meant to be limited to any one method of projection.

In yet another embodiment, the graphic projection display 250 can include the display monitor 270 for receiving a projected image of a view corresponding to the driving scene of the vehicle and displaying a graphic thereon. The display monitor 270 can be mounted on the vehicle dashboard or located somewhere in the vehicle convenient for viewing by the operator. The display monitor 270 can include a monitor associated with a computer utilized in police vehicles.

In an alternative embodiment, the graphic projection display 250 can include the non-transparent components 280 for receiving a projected image of a view corresponding to the driving scene of the vehicle and displaying a graphic thereon. The non-transparent components 280 can include a dashboard, seats, headrests, structural pillars, roofs, sun visors and steering wheels. The non-transparent components 280 can include a transparent phosphor film reactive to display graphics in response to an excitation projector. Co-pending U.S. application Ser. No. 12/563,407, which is incorporated herein by reference, discloses projecting images upon non-transparent components.

Figure 4:
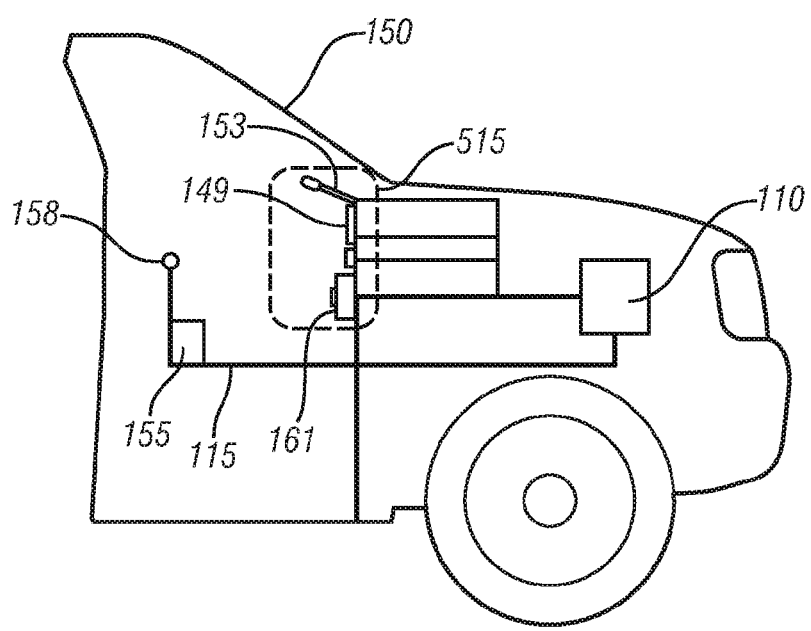
FIG. 4 illustrates the exemplary user input module illustrated in FIG. 1, in accordance with the present disclosure.

Referring to FIG. 4, the exemplary user input module (UIM) 515 for receiving user inputs indicated to a portion of the graphic projection display 250 is illustrated, in accordance with the present disclosure. The user inputs are monitored by the EVS system manager 110 and eventually utilized for displaying graphics upon the graphic projection display 250 (e.g., HUD 150) corresponding to the driving scene. It will be appreciated that the UIM 515 includes embodiments of user input devices and modules, and that the exemplary vehicle may only include one of the input devices and modules included within the UIM 515 for receiving and monitoring a user input indicated to a portion of the graphic projection display 250. However, embodiments are envisioned where the vehicle can include variations of the user input devices and modules included within the UIM 515 and selected ones can be enabled based on a vehicle user's preference. The UIM 515 includes an imaging device 161, a touch screen input module (TSIM) 149 and a controller device 153.

The TSIM 149 can be configured to receive touch gestures of a hand or finger of the user upon the module and indicated to a portion of the graphic projection display corresponding to the driving scene. The TSIM 149 can additionally include a display corresponding to the driving scene of the vehicle and configured to dynamically register graphics thereon. As will become apparent, the received touch gestures of the hand of the user provides a touch-based user interface for determining a view finder graphic representing a user-defined view finder.

Various devices are known in the art that can receive touch gestures of a hand or finger of a user. The TSIM 149 can be a touch screen device including a display screen which can identify the occurrence, location and position of a touch inside the display region. The display can correspond to a view of the driving scene of the vehicle. The TSIM 149 can be integrated within the HMI device 151 (see FIG. 2), the display monitor 270 (see FIG. 2), a personal digital assistant (PDA) or a cell phone, all having displays corresponding to the driving scene of the vehicle. Hence, the TSIM 149 facilitates a user to interact with what is displayed on the display (i.e., the driving scene); rather than indirectly with a mouse or touchpad and it lets the user perform the touch gestures without necessitating such middle devices.

Furthermore, various methods are known in the art for monitoring and receiving touch gestures of the hand or finger of the user. In a non-limiting embodiment, the TSIM 149 can be a resistive touch screen display composed of standard glass sheet that is coated with a thin conductive and a resistive metallic sheet, wherein an electrical current travels between the two layers and monitors the touch gesture when the two layers contact each other in the same location and thereby interrupting the electrical current. In another non-limiting embodiment, the TSIM 149 can be a surface wave touch screen display utilizing ultrasonic waves to process user inputs from the screen. In other words, the surface wave touch screen display utilizes a transducer identifying if a signal has been altered by a touch at any movement, where ultrasonic waves flow over the entire screen when the user touches the display at a specific location. In yet another non-limiting embodiment, the TSIM 149 can be a capacitive touch screen display composed of an indium tin oxide sheet that stores electrical charge and is positioned on a glass layer of the display. When the hand or finger of the user input contacts the display, a small quantity of the charge is transmitted to the hand or finger of the user and the quantity of charge on the capacitive sheet reduces. A processor associated therewith computes the comparative variation and determines the precise location where the touch-gesture took place, the location corresponding to the location on the driving scene of the vehicle. In yet another non-limiting embodiment, the TSIM 149 can include infrared touch screen displays. Infrared touch screen displays can react to infrared or thermal waves (i.e., heat). Infrared touch screen displays can further utilize vertical and horizontal infrared sensors around the perimeter to create a grid, and thus pinpoint the exact location where the display screen has been touched by the hand or finger of the user.

The TSIM 149 is not to be limited to any of the devices and methods discussed above and that the TSIM 149 only be capable of receiving touch gestures of a hand or finger of the user upon the module 149 and indicated to a portion of the graphic projection display 250 corresponding to the driving scene, wherein the received touch gestures of the hand of the user provides a touch-based user interface for determining the view finder graphic (i.e., virtual frame graphic) representing the user-defined view finder.

The controller device 153 includes a mechanism, such as a joystick, mouse, lever, stylus, touch pad or other accessory for receiving user manipulations indicated to a portion of the graphic projection display 250 (e.g., HUD 150). As will become apparent, the received user manipulations to the controller device 153 can provide a controller-based interface for determining the view finder graphic (i.e., virtual frame graphic) representing the user-defined view finder.

The imaging device 161 described above includes capturing images of the hand of the user and utilizing software associated therewith to monitor the location and orientation of the hand of the user to provide an optical image. The images can be captured utilizing infrared or ultraviolet technology. The optical image can be processed to generate three-dimensional (3D) mapping of the hand movement of the user. As will become apparent, the optical image of the hand movement provides a gesture-based user interface for determining the view finder graphic (i.e., virtual frame graphic) representing the user-defined view finder. Therefore, user hand movements (i.e., gesturing) detected by the imaging device 161 can be used in place of tactile interface elements such as a mouse, lever, joystick, knob or other accessory. The imaging device 161 requires capturing a sequence of images, wherein the location and the orientation of the hand of the user is monitored for each image to provide the optical image of the hand movement of the user. The software associated with the imaging device 161 can be integrated within the imaging device 161 and in signal communication with the EVS system manager 110 by suitable dedicated circuitry. Additionally, the software associated with the imaging device 161 can be integrated within the EVS system manager 110.

Various methods are known in the art that use imaging devices to process optical images based on the monitored location and orientation of an object (i.e., a hand) to generate 3D mapping of the object. PCT International Publication WO 2007/043036, which is incorporated herein by reference, discloses a method and system based on projecting a laser speckle pattern onto an object, and then analyzing an image of the pattern on the object. U.S. Pat. No. 6,100,517, which is incorporated herein by reference, discloses a method of using pulsed modulation in order to measure time of flight of light from an object to a detector, where a camera creates an image indicating distances to points in objects in a scene. U.S. Publication No. 2010/0020078 A1, which is incorporated herein by reference, discloses a method of illuminating an object with beams of radiation and generating intensity-based 3D mapping of the object. The present disclosure is not limited to any of the methods discussed above, as long as the imaging device 161 can monitor the location and the orientation of a hand of the user and process an optical image of hand movement of the user based on the monitored location and orientation of the hand of the user, wherein the optical image of the hand movement can provide a gesture-based user interface for determining a view finder graphic (or virtual frame graphic) representing the user-defined view finder.

Figure 5:
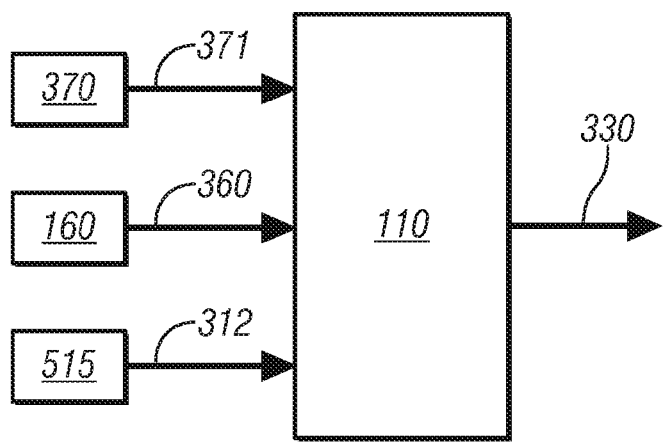
FIG. 5 illustrates an exemplary information flow for dynamically registering a graphic on a driving scene utilizing the graphic projection display, in accordance with the present disclosure.

FIG. 5 illustrates an exemplary information flow for dynamically registering a graphic on a driving scene utilizing the graphic projection display 250 including an EVS system manager 110 monitoring inputs from the occupant eye location sensing system 160, inputs from a vehicle location and orientation module 370 and inputs from the UIM 515 to thereby generate display requirements 330, in accordance with the present disclosure. The graphic can include a view finder graphic (i.e., virtual frame graphic) representing a user-defined view finder. The graphic can further include a trace graphic representing a generated trace based on a user input indicated to a portion of the graphic projection display corresponding to a view of the driving scene. The graphic can further include a feedback graphic (e.g., a cursor) illustrating movement of the monitored input indicated to the portion of the graphic projection display. In other words, the feedback graphic illustrates movement of the monitored user input to align the user input for generating the trace at a desired location upon the graphic projection display corresponding to the driving scene and having desired dimensions to define the user-defined window.

With reference to FIGS. 1 and 5, the occupant eye location sensing system 160 includes sensors known in the art to approximate a location of the head of an occupant and further the orientation or gaze location of the eyes of the occupant. An occupant can be an operator of the vehicle or a passenger within the vehicle. Head and eye sensing devices are known in the art and will not be discussed in great detail herein. For the purposes of this disclosure, a camera based device is utilized in combination with image recognition software to estimate a three-dimensional head location within the vehicle, able to be coordinated with a vehicle coordinate system, and a direction of occupant's gaze based upon image recognition programming. An eye location input 360 is input to the EVS system manager 110.

A current location and orientation of the vehicle can be determined by methods known in the art such as, but not limited to, monitoring the GPS device 140 in conjunction with a 3D map database and a digital compass including detailed information relating to a global coordinate received by the GPS device 140 regarding the current location of the vehicle. The current location and orientation can also be determined by vehicle kinematics including at least vehicle speed and yaw rate, available through sensors monitoring vehicle operation and/or monitoring accelerometer readings. Utilizing the methods discussed above, the vehicle location and orientation module 370 generates a vehicle location and orientation input 371 to the EVS system manager 110.

The UIM 515 can be configured to monitor the user input location indicated to a portion of the graphic projection display. In other words, the location of the user input refers to the location of the indicated portion upon the graphic projection display corresponding to the driving scene at which the monitored user input is directed towards. A user input location 312 is input to the EVS system manager 110.

The EVS system manager thereby 110 monitors the eye location input 360, the vehicle location and orientation input 371 and the user input location 312 to thereby generate the display requirements 330 for dynamically registering the graphic upon the graphic projection display. It is appreciated that if the graphic includes the feedback graphic, it may only be necessary to monitor the eye location input 360 and the user input location 371 to generate the display requirements 330 for dynamically registering the feedback graphic upon the graphic projection display 250.

Therefore, based on the occupant eye location, the user input location and the current location and orientation of the vehicle, an estimated point of intersection between an object on the driving scene the operator desires to view and the operator's eyes can be determined upon the display, thereby enabling graphical images to by dynamically registered to a location upon the display corresponding to the driving scene of the vehicle, such that the occupant of the vehicle can view the object on the driving scene and the view finder graphic representing the user-defined view finder.

Figure 6:
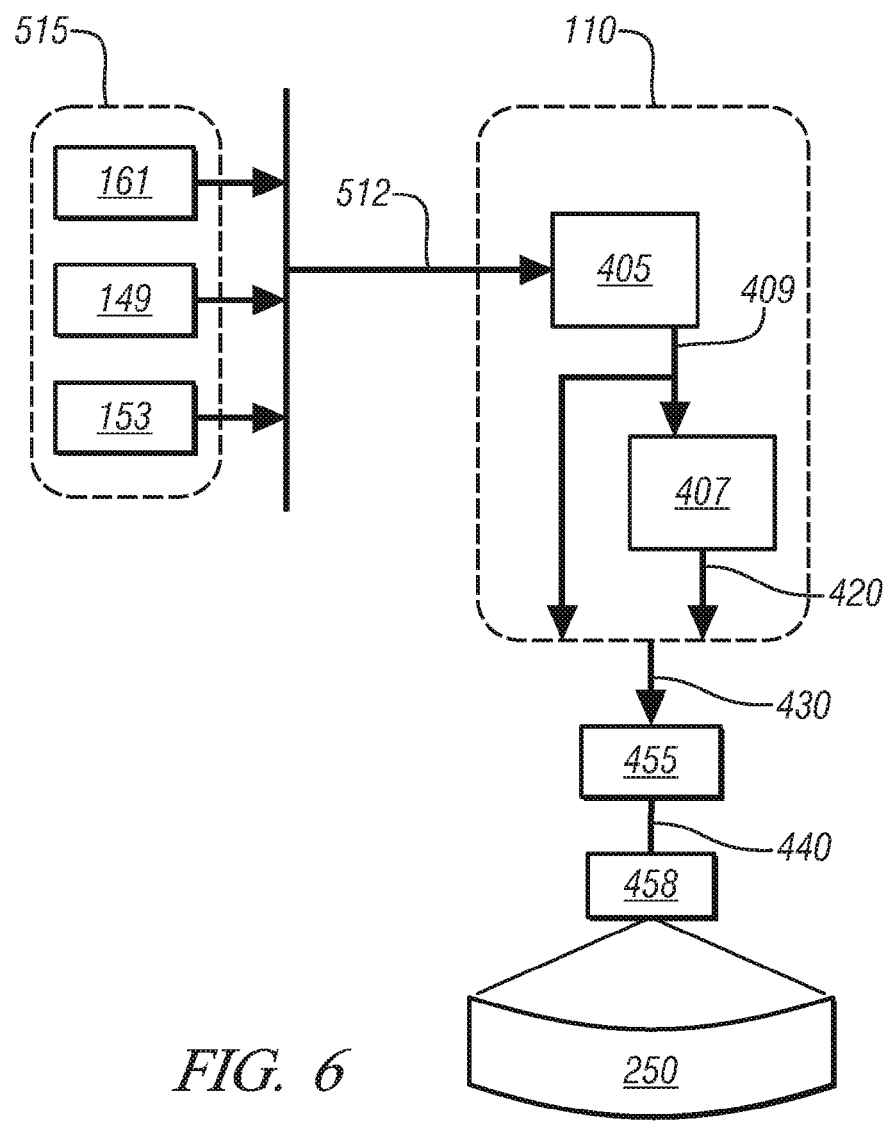
FIG. 6 illustrates an exemplary information flow to determine a view finder graphic representing a user-defined view finder, in accordance with the present disclosure.

Referring to FIG. 6, an exemplary information flow to determine a view finder graphic (i.e., virtual frame graphic) representing a user-defined view finder where the view finder graphic is dynamically registered and displayed upon a graphic projection display corresponding to the driving scene of the vehicle is illustrated in accordance with the present disclosure. As aforementioned, an image of a view corresponding to the driving scene can be projected upon the graphic projection display. The information flow includes an EVS system manager 110 monitoring information from various sources and generating display requirements 430, graphics module 455 monitoring the display requirements 430 from the EVS system manager and generating graphics commands 440, and a graphics projection module 458 projecting light upon a graphic projection display 250. As aforementioned, the graphic projection display can include the substantially transparent windscreen head-up display 150, the non-transparent components 280, the vehicle touch screen 260, the HMI device 151, the display monitor 270 or any screen or display capable of displaying projected graphics and an image of a view corresponding to the road scene of the vehicle. It is appreciated that the graphic projection display 250 is not meant to be limited to any of the above displays.

The EVS system manager 110 includes and monitors a trace module 405 and a view finder module 407. Monitoring the trace module 405 includes monitoring a user input 512 indicated to a portion of the graphic projection display 250. The user input 512 is generated by the UIM 515 that can include one of the imaging device 161, the TSIM 149 or the controller device 153. The user input from each of the imaging device 161, the TSIM 149 and the controller device 153 is discussed in further detail below. The trace module 405 generates a trace input 409 based on the monitored user input 512. The trace input 409 is input to the view finder module 407, where the view finder module 407 determines a user-defined view finder 420 defined by the trace input 409.

The trace module 405 determines a location corresponding to the user input indicated to the portion of the graphic projection display to commence generating the trace input 409 and additionally determines dimensions defining the trace input 409 based on the monitored user-input 512. Hence, a user can generate a trace corresponding to a location on the driving scene and having dimensions desired by the user. The trace input 409 can include the user-input representing a rectangle, wherein the user-defined view finder 420 can be determined once the illustrated rectangle is complete. Alternatively, the user-defined view finder 420 can be determined after the user input illustrates the rectangle and initiates a command to determine the user-defined view finder 420. The trace is merely generated to define the user-defined view finder 420. Therefore, the user-defined view finder 420 defined by the trace input 409 includes the dimensions of the trace and the location desired by the user upon on the graphic projection display corresponding to the driving scene. As will become apparent, the user-defined view finder 420 can be utilized in association with the camera device 120 to capture still images corresponding to the driving scene within an area of the user-defined view finder 420 and/or capturing recorded video corresponding to the driving scene within the area of the user-defined view finder 420.

The graphics module 455 utilizing the display requirements 430 generated by the EVS system manager 110 and based on the user-defined view finder 420, generates a view finder graphic (i.e., virtual frame graphic) representing the user-defined view finder 420 as a graphics command 440 to the graphics projection module 458. It will be appreciated that the display requirements include dynamically registering a location of the view finder graphic (i.e., virtual frame graphic) upon the graphic projection display corresponding to the driving scene of the vehicle. The graphics projection module 458 displays the graphic onto the driving scene of the vehicle utilizing the graphic projection display 250. It will be further appreciated when the graphic projection display 250 includes one of the substantially transparent windscreen head-up display 150 or the non-transparent components 280, the graphic module 455 and the graphic projection module 458 correspond to the EVS graphics engine 155 and the graphic projection system 158, respectively.

Embodiments envisioned include the view finder graphic including a highlighted box graphic where the user-defined view finder includes an area encompassed by the highlighted box graphic. In other words, the highlighted box graphic is indicative of a virtual frame graphic projected upon the graphic projection display such that the area within the highlighted box graphic can be configured to capture images (or record video) corresponding to the driving scene in association with the camera system 120, illustrated in FIG. 1, or other image capturing device.

Further embodiments envisioned include determining a trace graphic describing the generated trace 409. In this embodiment, the trace input 409 generated by the trace module 405, in addition to being input to the view finder module 407, can by-pass the view finder module 407 and be directly monitored by the EVS system manager 112 to determine display requirements 430 associated with the trace input 409. The graphics module 455 utilizing the display requirements 430 generated by the EVS system manager 110 and based on the trace input 409, generates the trace graphic describing the trace input 409 as a graphics command 440 to the graphics projection module 458.

Embodiments envisioned include the trace graphic including a faintly lit box graphic based on the monitored user input indicated to the portion of the graphic projection display 250. The trace graphic can further include a highlighted segmented box graphic. Because the trace is merely determined to define the user-defined view finder, it is desirable that the graphic not be too distracting and that it be distinguishable from the view finder graphic. It will be further appreciated that the trace graphic can be dynamically registered, determined and displayed in real-time based on the user input 512. Hence, the trace graphic can be determined and displayed in real time as the user is inputting to the UIM 515. For instance, and in a non-limiting example, when the graphic projection display 250 includes the substantially transparent windscreen head up display 150, the graphic projection system 158 (i.e., graphic projection module 458) imitates the movement of the user input 512 and correspondingly projects the trace graphic in real-time based on the user input indicated to the portion of the windscreen head up display 150.

In an alternative embodiment, the virtual frame graphic encompassing the user-defined view finder displayed upon the graphic projection display can be monitored and subsequently manipulated based on a second user input indicated to a second portion of the graphic projection display 250. A second view finder graphic (i.e., second virtual frame graphic) can be determined corresponding to the manipulated view finder graphic, wherein the second view finder graphic encompasses a second user-defined view finder window. Hence, if the user of the vehicle is not satisfied with the size or location of the view finder displayed upon the graphic projection display 250, the user may manipulate the view finder graphic (i.e., virtual frame graphic) encompassing the user-defined view finder to determine the second virtual frame graphic encompassing the second user-defined view finder. Hence, the user, based upon the user input 512, can resize the view finder graphic by manipulating the view finder graphic to an increased size or a decreased size. Likewise, the user can change the location of the view finder graphic by manipulating the view finder graphic to a different location upon the graphic projection display. For instance, a grab-and-drag function could re-locate the view finder graphic and subsequently capture an image of an object of interest within an area encompassing the manipulated view finder graphic and corresponding to the driving scene.

In an exemplary embodiment, the monitored user input 512 indicated to the portion of the graphic projection display includes utilizing the imaging device 161 monitoring a location and an orientation of a hand or finger of the user and processing an optical image of hand or finger movement of the user based on the monitored location and orientation of the hand or finger of the user. The optical image of the hand or finger movement can provide a gesture-based user interface for generating the trace. For instance, a user can wave a hand or finger in proximity of the imaging device in a manner indicated to the portion of the graphic projection display to generate the trace. It will be understood that once the generated trace includes a shape indicating a rectangle, the user-defined view finder can be determined and the virtual frame graphic encompassing the user-defined view finder is determined such that a still image or recorded video can be obtained of the driving scene within an area of the user-defined view finder. In an alternative non-limiting example, the user can initiate a command based on hand or finger movement within proximity of the imaging device 161 to initiate the determination of the user-defined window once the trace is generated. It will be further understood that the feedback graphic can be utilized to align the user input to the indicated portion of the graphic projection display for generating the trace.

In another exemplary embodiment, the monitored user input 512 indicated to the portion of the graphic projection display includes utilizing the TSIM 149 for receiving touch gestures of a hand or finger of the user upon the display of the TSIM 149. The TSIM 149 can include a display including an image of a view corresponding to the driving scene. The received touch gestures are indicated to a portion of the graphic projection display, wherein the touch gestures of the hand or finger of the user can provide a touch-based user interface for generating the trace. Hence, the TSIM 149 can allow the user to generate the trace directly onto a desired location of the driving scene because the driving scene is displayed upon the display of the TSIM. It is appreciated that the feedback graphic would not have practicality because the touch-based interface allows the hand or finger to directly align the user input to the indicated portion of the graphic projection display for generating the trace.

In yet another exemplary embodiment, the monitored user input 512 indicated to the portion of the graphic projection display includes utilizing the controller device 153 for receiving user manipulation to—or upon—the controller device. It will be appreciated that the controller device 153 is in signal communication with the graphic projection display. In a non-limiting example, the controller device 153 can be utilized in association with—or integrated within—the HMI device 151 including a display associated therewith. For instance, the display can identify the user input when the controller device 153 includes a stylus manipulated by the user and in direct contact with the display. In another non-limiting example, the controller device 153 including a joystick can direct a user input indicated to a portion of the graphic projection display corresponding to the driving scene. It is appreciated that a feedback graphic monitoring movement of the monitored user input would be beneficial for controller-based interfaces that include a joystick, mouse, touch pad, or knob but would not have any application to a controller-based interface such as the stylus.

Figure 7:
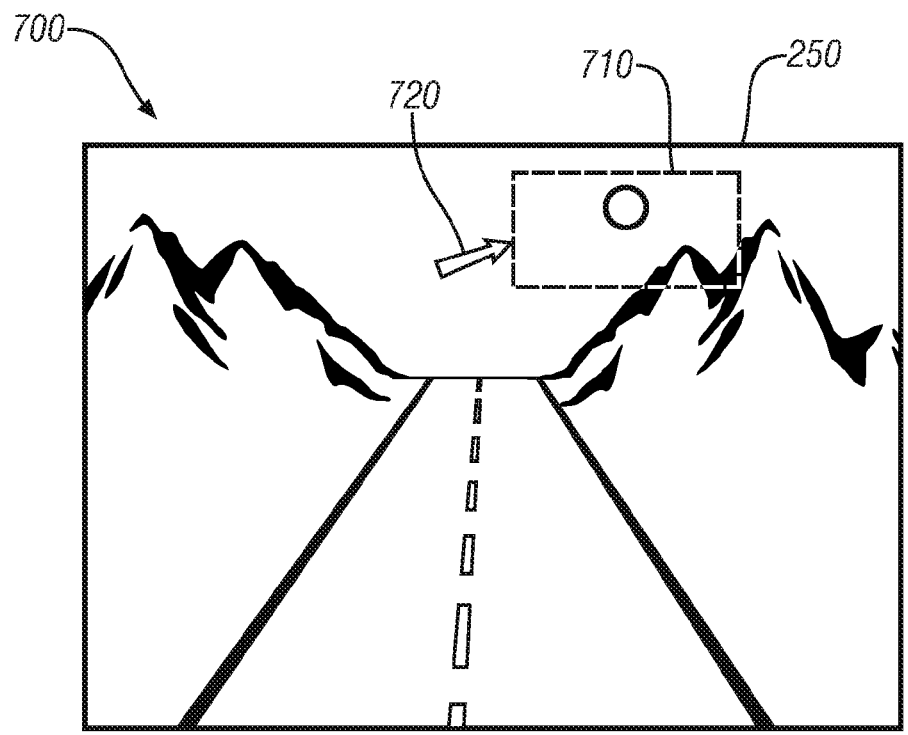
FIGS. 7 and 8 illustrate driving scenes including graphics dynamically registered upon a graphic projection display of a vehicle, wherein the graphic projection display corresponds to a driving scene of the vehicle, in accordance with the present disclosure.

Referring to FIG. 7, a driving scene 700 is illustrated upon a graphic projection display 250 of a vehicle. If the graphic projection display 250 includes a substantially transparent windscreen head-up display, the driving scene 700 is illustrated through the substantially transparent windscreen head-up display. Otherwise, an image of a view of corresponding to the driving scene is projected upon the graphic projection display. Utilizing methods described above, a trace 710 is generated based on a monitored user input indicated to a portion of the graphic projection display 250 and corresponding to the view of the driving scene. Specifically, a trace graphic of a highlighted segmented box represents the generated trace 710. A feedback graphic 720 including a cursor graphic illustrates monitored movement of the user input. In this non-limiting example, the trace 710 is utilized to define a subsequently determined user-defined view finder including dimensions and a location desired by the user where the user can capture an image and/or record video corresponding to the driving scene within an area of the trace.

Figure 8:
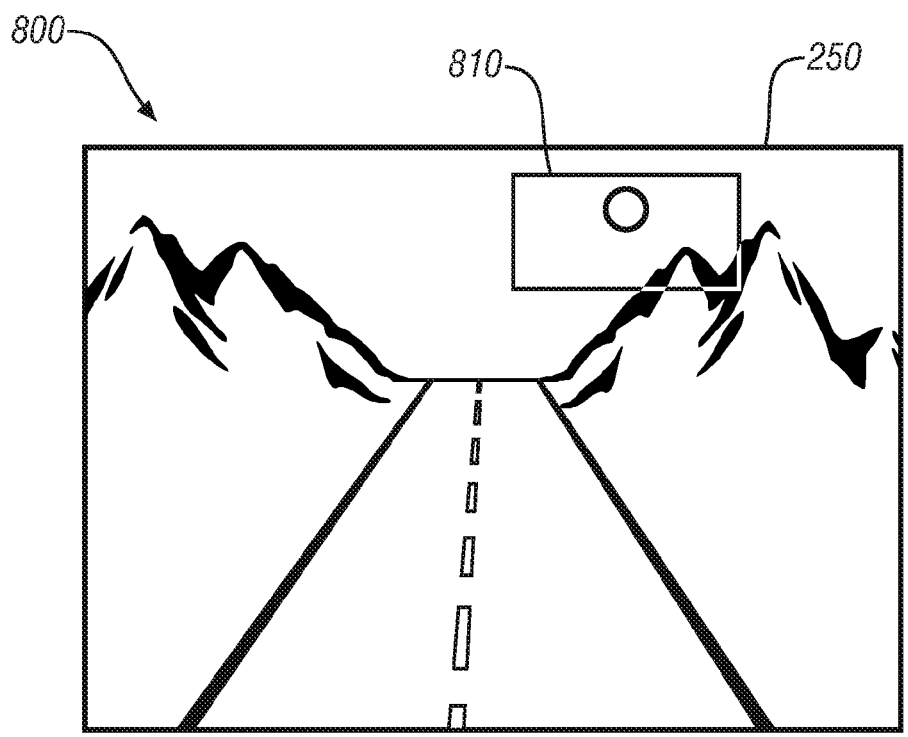

Referring to FIG. 8, a driving scene 800 is illustrated upon a graphic projection display 250 of a vehicle. If the graphic projection display 250 includes a substantially transparent windscreen head-up display, the driving scene 800 is illustrated through the substantially transparent windscreen head-up display. Otherwise, an image of a view of corresponding to the driving scene is projected upon the graphic projection display. Utilizing methods described above, a view finder graphic 810 representing a user-defined view finder is depicted. Specifically, the user-defined view finder is defined by the generated trace 710 of FIG. 7. The view finder graphic 810 can be determined and displayed once the generated trace 710 of FIG. 7 includes a rectangular shape. Alternatively, the view finder graphic 810 can be determined and generated based upon a user command subsequent to generating the trace. The view finder graphic 810 is depicted by a highlighted box graphic indicative of a virtual frame graphic. In this non-limiting example, the user-defined view finder can be utilized in association with a camera device to capture still images or record video corresponding to the driving scene within an area of the user-defined view finder (i.e., view finder graphic 810).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to dynamically register a view finder graphic on a driving scene of a vehicle utilizing a graphic projection display, comprising:
   monitoring a user input indicated to a portion of the graphic projection display;
   generating a trace based on the monitored user input indicated to the portion of the graphic projection display;
   determining a view finder graphic representing a user-defined view finder, the user-defined view finder defined by the generated trace;
   monitoring an occupant eye location to determine a gaze location of the occupant indicated to a portion of the driving scene;
   estimating a point of intersection between the monitored user input indicated to the portion of the graphic projection display and the gaze location of the occupant indicated to the portion of the driving scene;
   dynamically registering a location of the view finder graphic upon the graphic projection display corresponding to the driving scene of the vehicle based upon the estimated point of intersection; and
   displaying the view finder graphic upon the graphic projection display.

2. The method of claim 1 wherein the graphic projection display comprises a substantially transparent windscreen head-up display comprising one of light emitting particles or microstructures over a predefined region of the windscreen permitting luminescent display while permitting vision therethrough.

3. The method of claim 1 wherein the graphic projection display comprises one of a touch screen display, a human machine interface display, non-transparent components and a display monitor.

4. The method of claim 3 further comprising:
   projecting an image of a view corresponding to the driving scene of the vehicle upon the graphic projection display.

5. The method of claim 1 wherein the view finder graphic comprises a highlighted box graphic and the user-defined view finder comprises an area encompassed by the highlighted box graphic.

6. The method of claim 1 wherein the user-defined view finder defined by the generated trace captures still images corresponding to the driving scene within an area comprising the user-defined view finder.

7. The method of claim 1 wherein the user-defined view finder defined by the generated trace captures recorded video corresponding to the driving scene within an area comprising the user-defined view finder.

8. The method of claim 1 further comprising:
   determining a trace graphic representing the generated trace;
   dynamically registering a location of the trace graphic upon the graphic projection display corresponding to the driving scene of the vehicle; and
   displaying the trace graphic upon the graphic projection display.

9. The method of claim 8 wherein the trace graphic comprises a highlighted segmented box.

10. The method of claim 1 further comprising:
    determining a feedback graphic illustrating movement of the monitored user input indicated to the portion of the graphic projection display;
    dynamically registering a location of the feedback graphic upon the graphic projection display corresponding to the driving scene of the vehicle; and
    displaying the feedback graphic upon the graphic projection display.

11. Method to dynamically register a virtual frame graphic on a driving scene of a vehicle utilizing a graphic projection display, comprising:
    monitoring a user input indicated to a portion of the graphic projection display;
    generating a trace based on the monitored user input indicated to the portion of the graphic projection display;

determining a virtual frame graphic encompassing a user-defined view finder, the virtual frame graphic defined by the generated trace;

monitoring an occupant eye location to determine a gaze location of the occupant indicated to a portion of the driving scene;

estimating a point of intersection between the monitored user input indicated to the portion of the graphic projection display and the gaze location of the occupant indicated to the portion of the driving scene;

dynamically registering a location of the virtual frame graphic upon the graphic projection display corresponding to the driving scene of the vehicle based upon the estimated point of intersection; and displaying the virtual frame graphic upon the graphic projection display.

12. The method of claim 11 wherein monitoring the user input indicated to the portion of the graphic projection display comprises:

utilizing an imaging device monitoring a location and an orientation of a hand of the user;

processing an optical image of hand movement of the user based on the monitored location and orientation of the hand of the user; and wherein the optical image of the hand movement provides a gesture-based user interface for generating the trace.

13. The method of claim 11 wherein monitoring the user input indicated to the portion of the graphic projection display comprises:

utilizing a touch screen input module receiving touch gestures of a hand of the user upon the touch screen input module, the touch gestures indicated to the portion of the graphic projection display; and wherein the received touch gestures of the hand of the user provides a touch-based user interface for generating the trace.

14. The method of claim 11 wherein monitoring the user input indicated to the portion of the graphic projection display comprises:

utilizing a controller device receiving user manipulations to the controller device, the user manipulations to the controller device indicated to the portion of the graphic projection display; and wherein the received user manipulations to the controller device provides a controller-based interface for generating the trace.

15. The method of claim 11 further comprising monitoring a current location and orientation of the vehicle: and wherein dynamically registering the location of the virtual frame graphic upon the graphic projection display corresponding to the driving scene is further based upon the current location and orientation of the vehicle.

16. The method of claim 11 further comprising:

monitoring the virtual frame graphic encompassing the user-defined view finder displayed upon the graphic projection display;

monitoring a second user-input indicated to a second portion of the graphic projection display;

manipulating the virtual frame graphic encompassing the user-defined view finder based upon the monitored second user input indicated to the second portion of the graphic projection display;

determining a second virtual frame graphic corresponding to the manipulated virtual frame graphic, the second virtual frame graphic encompassing a second user-defined view finder;

dynamically registering a location of the second virtual frame graphic upon the graphic projection display corresponding to the driving scene of the vehicle; and displaying the second virtual frame graphic upon the graphic projection display.

17. The method of claim 16 wherein manipulating the virtual frame graphic comprises one of increasing and decreasing a size of the virtual frame graphic.

18. The method of claim 16 wherein manipulating the virtual frame graphic comprises re-positioning the virtual frame graphic to a desired location upon the graphic projection display.

19. The method of claim 11 wherein the graphic projection display comprises a substantially transparent windscreen head-up display comprising one of light emitting particles or microstructures over a predefined region of the windscreen permitting luminescent display while permitting vision therethrough.

20. System to dynamically register a virtual frame graphic on a driving scene of a vehicle utilizing a graphic projection display, comprising:

an enhanced vision system system manager:

monitoring a user input indicated to a portion of the graphic projection display;

generating a trace based on the monitored user input indicated to the portion of the graphic projection display;

determining a view finder graphic encompassing a user-defined view finder, the user-defined view finder defined by the generated trace;

monitoring an occupant eye location to determine a gaze location of the occupant indicated to a portion of the driving scene;

estimating a point of intersection between the monitored user input indicated to the portion of the graphic projection display and the gaze location of the occupant indicated to the portion of the driving scene;

dynamically registering a location of the view finder graphic upon the graphic projection display corresponding to the driving scene of the vehicle based upon the estimated point of intersection;

a graphics system generating the view finder graphic encompassing the user-defined view finder; and a graphics projection system communicating with the graphics system and displaying the view finder graphic describing the user-defined view finder upon the graphic projection display.

* * * * *